United States Patent
Salter et al.

(10) Patent No.: US 7,860,133 B2
(45) Date of Patent: Dec. 28, 2010

(54) METHOD FOR TRANSFERRING AND SEPARATING TELEPHONE CALL DATA

(75) Inventors: Ken Salter, Mobile, AL (US); Seacol Chin, Mobile, AL (US); Brian Wilson, Mobile, AL (US); Veronica Diaz, Mobile, AL (US); Jay Birch, Mobile, AL (US); Joseph Anders, Mobile, AL (US)

(73) Assignee: **Global Tel*Link Corporation**, Mobile, AL (US)

( * ) Notice: Subject to any disclaimer, the term of this patent is extended or adjusted under 35 U.S.C. 154(b) by 90 days.

(21) Appl. No.: 11/970,055

(22) Filed: Jan. 7, 2008

(65) Prior Publication Data

US 2008/0108382 A1    May 8, 2008

Related U.S. Application Data

(62) Division of application No. 10/695,968, filed on Oct. 29, 2003.

(60) Provisional application No. 60/422,399, filed on Oct. 29, 2002.

(51) Int. Cl.
    *H04M 11/06* (2006.01)
(52) U.S. Cl. .................................... 370/522
(58) Field of Classification Search .................. 370/522
    See application file for complete search history.

(56) References Cited

U.S. PATENT DOCUMENTS

| | | |
|---|---|---|
| 4,813,040 A | 3/1989 | Futato |
| 4,972,183 A | 11/1990 | Kuhlmann et al. |
| 5,121,385 A | 6/1992 | Tominaga et al. |
| 5,588,041 A | 12/1996 | Meyer et al. |
| 5,872,834 A | 2/1999 | Teitelbaum |
| 6,052,454 A | 4/2000 | Kek et al. |
| 6,072,860 A | 6/2000 | Kek et al. |
| 6,570,891 B1 | 5/2003 | Arimilli |
| 6,687,350 B1 | 2/2004 | Landry et al. |
| 7,092,494 B1 | 8/2006 | Anders et al. |

*Primary Examiner*—Melvin Marcelo
(74) *Attorney, Agent, or Firm*—Dority & Manning, P.A.

(57) ABSTRACT

The invention consists of equipment and a method for allowing old line capacity to provide near dsl or superior dsl quality telephone connections. A method of handling a telephone call with an associated data package over a telephone system having a power pair of lines and a second pair of communication lines with the steps of: a) determining the types of data desired to create a data group from the group consisting of voice, picture, bio-marker (finger print, retinal scan, etc.), card holder information (credit card number, etc.), DNIS and ANSI call data, generating at least one first byte digital data from at least one first digital data generator; generating at least one second type digital data from at least one second digital data generator; prioritizing the data between the at least one first byte digital data and at least one second type digital data so that the at least one first byte digital data is given priority; determining the bandwidth associated with transmission of the at least one first byte digital data; preferentially sending the at least one first byte of digital data within the bandwidth associated therewith; and adding bandwidth as required to include the at least one second type digital data. The data is separated and forwarded on at a site remote from the phones. Data is carried to the phone as well as away from the phone using this prioritized process.

3 Claims, 5 Drawing Sheets

METHOD FOR TRANSFERRING AND SEPARATING TELEPHONE CALL DATA

PRIORITY CLAIM

This application is a divisional of U.S. Ser. No. 10/695,968 entitled "METHOD FOR TRANSFERRING AND SEPARATING TELEPHONE CALL DATA" filed Oct. 29, 2003 which claims priority of Provisional Patent Application Ser. No. 60/422,399 filed Oct. 29, 2002, each of which are incorporated herein by reference in their entirety for all purposes.

FIELD OF THE INVENTION

The present invention relates to specialized telephone equipment and corresponding data transfer methods.

PRIOR ART

The prior art has numerous protocol methods utilized for the transmission of digital and analog data. Some of the types relevant from the prior art include the following:

DSL or Digital Subscriber Line: A general term for any local network loop that is digital in nature; technically, DSL equates to ISDN BRI, but this is decreasingly enforced terminology. DSL technology is available in several varieties. See also ADSL, HDSL, IDSL, RADSL, SDSL, VDSL, xDSL. None of these are a good fit as the equipment cost, implementation requirements, standards, minimum requirements for functionality, integration into existing facilities and particular application usage disqualifies all these types of solutions for communication in some systems. All of these involve some level of multiplexing, using several frequencies on the same channel to transmit several different streams of data, from different sources, simultaneously.

The amount of data that can be sent through a network connection is measured in bits per second (bps). The range of transmission frequencies the LAN network can use, known generically as bandwidth, is expressed as the difference between the highest and lowest frequencies of a transmission channel (in Hertz, or cycles per second). High bandwidth allows fast transmission or high-volume transmission.

ADSL. Asymmetric Digital Subscriber Line is a term for one-way T1 transmission of signals to the home over single twisted-pair wiring already going to homes in the prior art. ADSL modems are attached to twisted pair copper wiring. ADSL is often provisioned with greater downstream than upstream rates (hence the term "asymmetric"). These rates are dependent on the distance a user is from the central office and may vary from as high as 9 Mbps to as low as 384 Kbps.

HDSL refers to High bit-rate Digital Subscriber Line. The oldest of the DSL technologies, HDSL continues to be used by telephone companies deploying T1 lines at 1.5 Mbps and requires two twisted pairs.

IDSL refers to ISDN Digital Subscriber Line. IDSL provides up to 144-Kbps transfer rates in each direction and can be provisioned on any ISDN capable phone line. Unlike ADSL and other DSL technologies, IDSL can be deployed regardless of the distance the user is from the central office.

RADSL rate adaptive Digital Subscriber Line. Using modified ADSL software, RADSL makes it possible for modems automatically and dynamically to adjust their transmission speeds. This often allows for good data rates for customers residing greater distances from the CO.

SDSL single-line Digital Subscriber Line or Symmetric Digital Subscriber Line. A modified HDSL software technology, SDSL is intended to provide 1.5 Mbps in both directions over a single twisted pair. However, the distance over which this can be achieved is less than 8,000 feet.

VDSL very high-rate Digital Subscriber Line. The newest of the DSL technologies, VDSL can offer speeds up to 25 Mbps downstream and 3 Mbps upstream. Similar to SDSL, the gain in speed can be achieved only at short distances. These maximum speeds can be achieved only up to 1,000 feet. Sometimes VDSL is called broadband digital subscriber line (BDSL).

XDSL a generic term for the suite of digital subscriber line (DSL) services, where the "x" can be replaced with any of a number of letters. See also DSL, ADSL, HDSL, IDSL, MDSL, RADSL, SDSL, VDSL.

The prior art involves the use of slow speed lines data associated with the telephone call. New technology high speed lines are used in order to transfer the data within a telephone call. Often times, the telephone data is separated at a switching service (the CO, for example) for purposes of obtaining billing information, but the separated data portion of the telephone call is consistently restricted to telephone call identification.

GENERAL DISCUSSION OF THE INVENTION

The present invention differs from the prior art in providing a protocol utilized in conjunction with a phone having a clock, a first quantum of call data, and at least one second quantum of information data associated with the telephone call and related or unrelated information which is created which is handled differently from the primary analog or converted analog to digital first part which is, typically, the conversation part of the telephone call. The telephone call data is sent utilizing preexisting data or voltage lines associated with the telephone in order to provide additional data for telephone monitoring and in order to provide more varied transfer potential and data transfer potential utilizing existing telephone lines. DSL type services associated with the call can be sent without providing additional DSL type telephone lines in a preexisting system and in particular a preexisting system that does not have easy conversion capability to a high speed telephone connection.

The invention comprises several features; being both a novel telephone, a novel phone system and a method of utilizing the phone system utilizing novel protocols. While the preferred embodiment teaches in terms of wiring, it will be obvious that certain features and protocols may be used with wireless systems or with systems converted to liens at the building wall to obtain the same benefits.

The present invention uses Programmable Logic Levels (PLLs) clock switchover management to maintain the timing of two or more "clocks". Data bytes made of multiple data bits are packaged and the packages are time coded utilizing NRZI data packaging at a local clock. For this packaging, the clocks are adjusted on voltage changes which are timed with zero bits at the end of the longer strings of non-zero data bytes of packaged bits. Using Programmable Logic Levels (PLLs) for data transmission the features are used for system-level clocking management. PLL circuitry features include clock switchover, PLL re-configuration, spread spectrum clocking, and programmable bandwidth.

This timing solution eliminates the need for multiple discrete timing devices on a board, thereby resulting in real and overall systems cost savings. In the system, a timing pulse is sent automatically to each connected phone. In the event the phone loses the digital signal for greater than a configurable time (currently 4 seconds), the phone reboots and reestablishes communications with the CBU (Central Block Unit) so manual intervention or complete system rebooting is not required to maintain a solid digital connection to each device attached.

The phone unit generates a plurality of digital signals which are encoded, prioritized and then sent to a decoder. The phone and decoder form a system capable of expandable features and/or functionality. Because the phones are modified to use existing lines in order to carry non-voice data, phones may be modified to achieve an almost limitless list of features and functions. Features or data generator devices are controlled by the digital smart phone's CUP (central processing unit) as well as with data from the interfacing CBU CPU. This timing solution eliminates the need for multiple discrete timing devices on a board. A single clock is used by all different data generators on the phone CPU circuit board. In the embodiments below, at least one device is run on a free wire pair directly from the CBU CPU or SCC CBU.

Newer features can be added by attaching a desired data generator device to the phone circuit board and changing the programming introduced into the system API and controlled by customizable software modules for encoding and decoding the data and for prioritizing the data streams based on this programming.

The protocol used not only changes or varies the data format for different data types, but also changes the way that the data is packaged in order to get maximum benefit from the available bandwidth given the user specified priorities in the software. If, for example, the voice is to come in first, then the software loaded on the CPU is able to allow for the voice to come in prioritized, although potentially at a reduced quality, and fit to in the remaining non-voice data as required and allowed by band width. Ultimately, all data (subject to user elected dumping) makes it from the phone to the CBU and from the CBU to the remote data processor 30. The data comes in on a specified and configurable priority which is programmatically set.

Changes made include bandwidth allocation, bandwidth expansion, data transfer speeds, and communication outlet selection where more than one method is present for distributing data. For example, the data may be sent from the phone CPU to the CBU CPU which takes voice data (non-voice data, e.g. billing and call (DNIS, e.g.) Information) to phone lines and equipment data to USB ports, firewall ports, or other specialized data ports. This allows high data transfer for multiple phones over specialized existing transfer protocols while individual phones or wires provide data over more narrow protocol lines.

It is therefore one purpose of the invention to provide for digital service of multiple phones without rewiring on existing service. No DSL type equipment is required, nor is any type of DSL type protocol or system used. Line multi-plexors, data splitters, DSL DSP's and DSL type firmware and hardware is not required on this system. The technology developed provides a high content digital service without the added expense and more restrictive wiring and equipment requirements of DSL type service. This technology can be retrofitted by using existing low speed lines at a much lower expense and less system overhead.

It is another purpose to provide for enhanced data associated with a telephone call with limited band width.

It is another purpose to provide a method for taking a telephone call and associated data and breaking it into discrete portions or handling discrete portions separately. It further provides for discreet portions to be separately handled, enhanced, compressed and manipulated in order to provide a better data stream (according to use defined preferences) associated with a telephone call and/or digital function.

These and other object and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EXEMPLARY EMBODIMENTS

Figure 1:
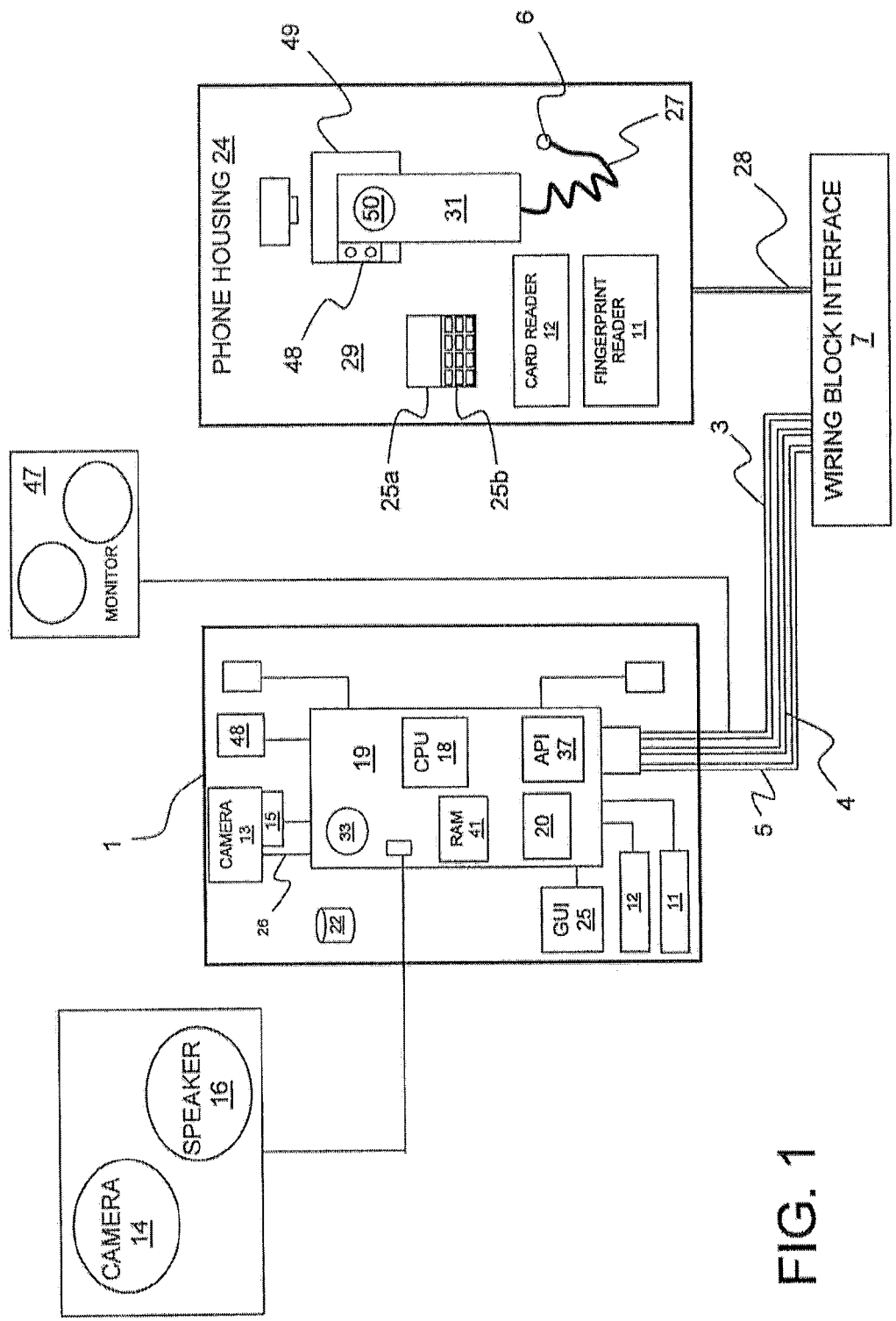
FIG. 1 shows a phone and central block unit used in conjunction with the method taught herein.

As can best be seen by reference to FIG. 1, the wiring of the system involves, in the simplest embodiment, utilizing a first single twisted pair for communication (voice pair 4) and a second twisted pair to operate the digital phone's main system power (power pair 5).

A standard analog phone assembly typically requires –24-48 VDC power on power pair 5 commonly known as tip and ring. For the purpose of this document, this wire pair is referred to as the power pair 5 as shown on FIG. 1. On this type of phone, all information (voice and DTMF) are sent through one (1) second pair of wires referred to as the voice pair 4. On analog phones, the 24-48 VDC twisted power pair 5 carries everything required to operate the analog phones.

There are two pairs required to operate the phone. Technically two requirements for functionality of the digital system include powering the system and providing communications. These functions are carried out using the same two pairs of wires previously discussed, but the communications are modified and organized as digital signals. For this phone, the power pairs of twisted wires are the same used for a standard analog phone supply 20-56 VDC. This power pair 5 is preferably analog power, usually 20-56 VDC. Nothing else is communicated or transmitted via this first twisted pair in the preferred embodiment.

The second twisted pair, the voice pair 4, is converted to run the digital portion of the unit which carries +2-5 Volt DC voice and data combined digital signals to the phone housing from the Channel Bank Unit (CBU) 32 and back. The voice pair 4 of wires to the phone 1 will carry the +2-5 VDC originating from the system CBU 32 ending up at the phone 1 and will power and communicate bi-directionally and synchronously with the microprocessors and accessories described below as the digital phone information group which group is completely independent of the first set of wires supplying nothing but the 20-56 VDC power.

Figure 2:
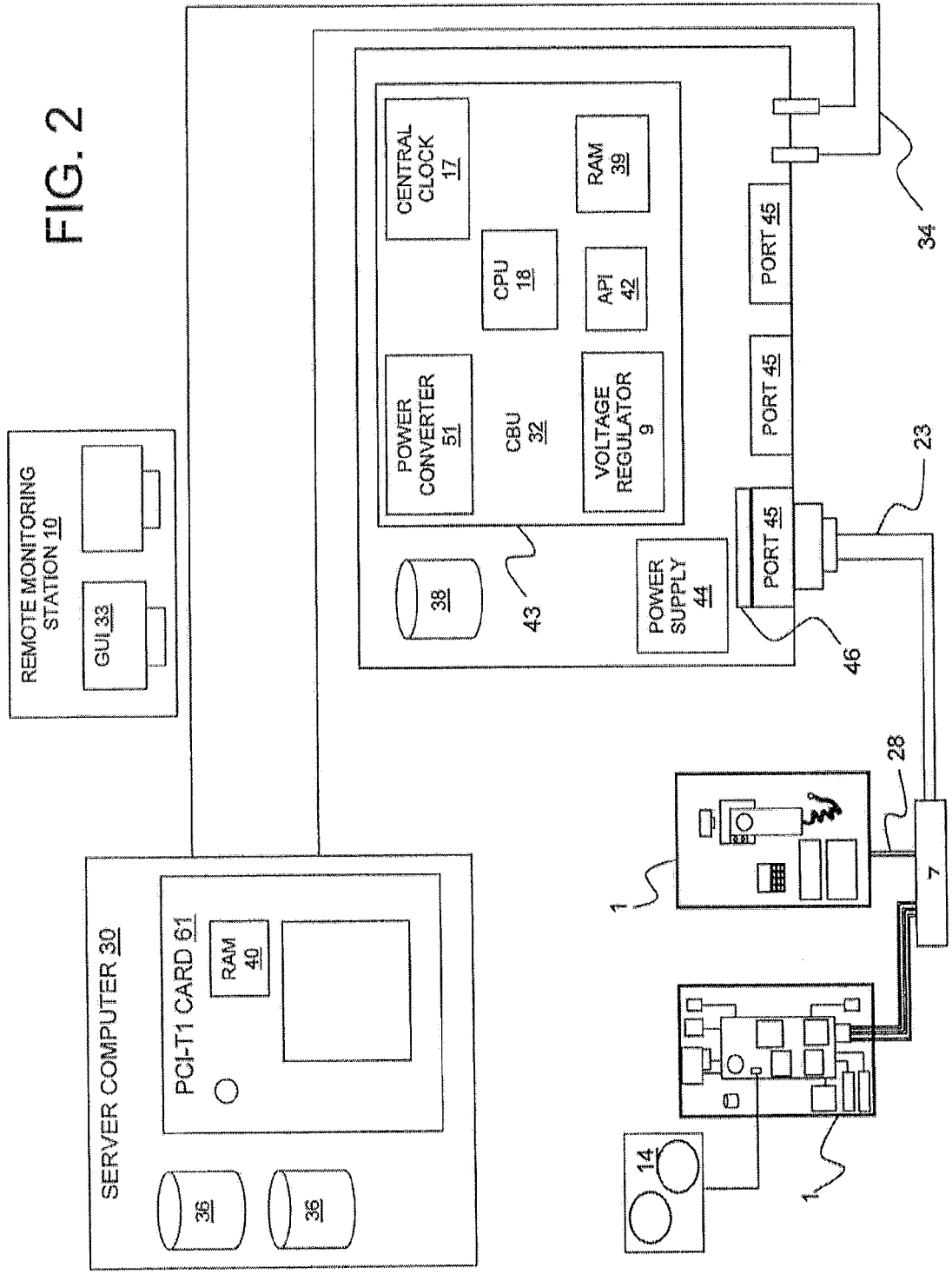
FIG. 2 shows the interface between the units shown in FIG. 1 and a central computer.

At existing sites, the old lines and original wiring already located may be retrofitted phone block. Where new lines are pulled and a new phone installed a set of wires 28 (usually Cat. III wiring but requiring only twisted pair wiring) is used to carry power of 24-48 volts (traditionally tip and ring) to the phone from an existing source or a new power source 44 (FIG. 2). The phone will preferably accept a voltage range from 20 VDC to 56 VDC. This wiring will usually pass through a wiring block interface 7. This interface 7 could be one or more Immediate Distribution Frames (IDF) for example. The interface 7 allows a single line from the power source 44 to power multiple phones. It could originate from buildings Main Distribution Frame (MDF) in the fashion known in the art; ultimately ending up at the source DC power supply 44.

Figure 3:
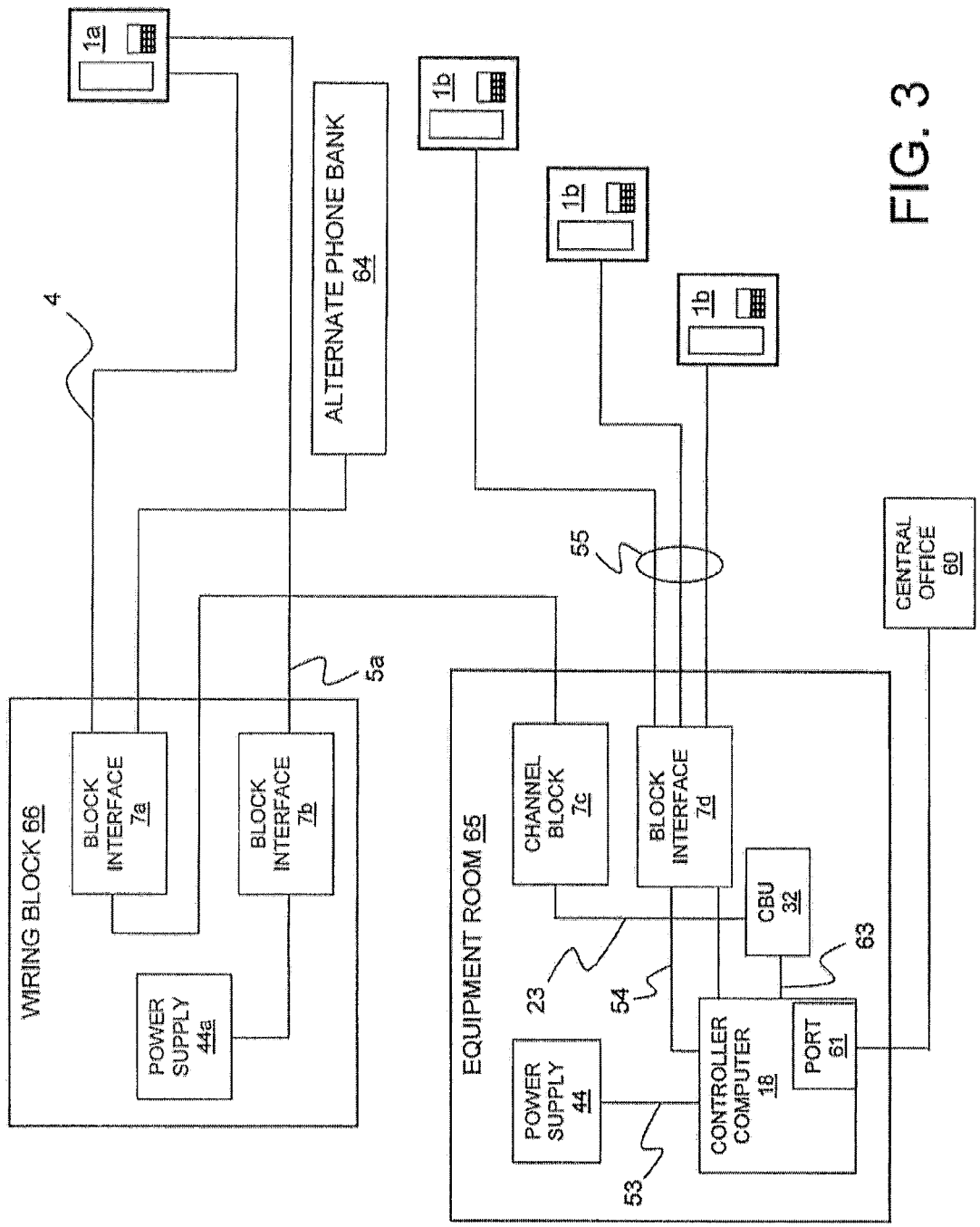
FIG. 3 shows a process diagram of the interaction of the units shown in FIG. 2 used in conjunction with analog phones.
Figure 4:
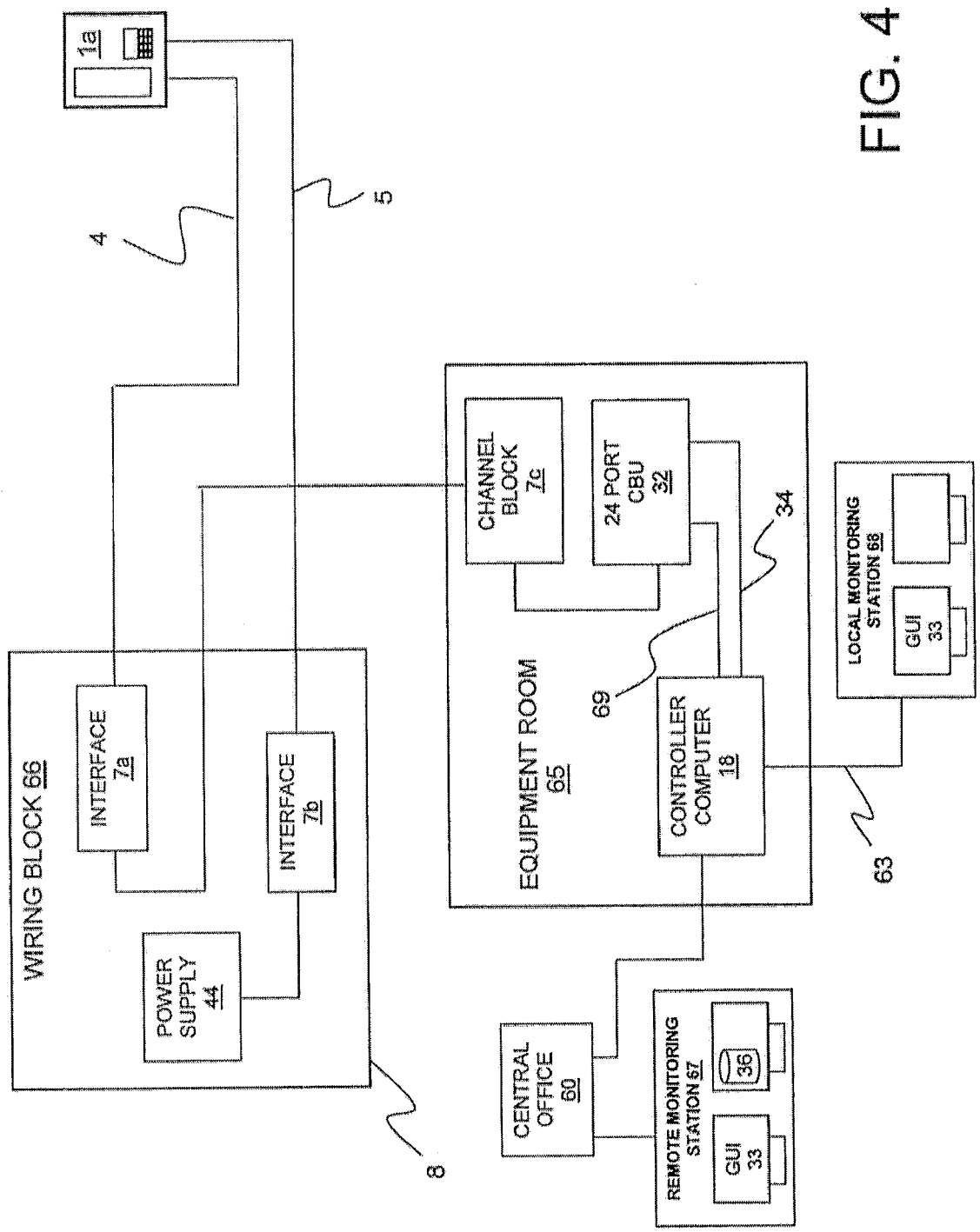
FIG. 4 shows a process diagram of the interaction of the units shown in FIG. 2.

In most cases, the IDF is fed input from an MDF and ends up at the phone with no other IDF interfaces between. An example would be a multi story building which would have a bottom floor MDF distributing to the other floors IDF's which would feed the phones on each floor. An MDF or IDF can run every phone in any configuration on an analog setup. An example of 2 ways of using this with the invention are shown in FIGS. 3 and 4.

The preferred embodiment uses pairs from the most convenient location involving the least amount of effort to lower cost and make it easier on the facility being integrated. The old line/original wiring already located at the phone housing as the voice pair is preferably currently installed at the site or close to where a new phone in installed on a wall. Cat. III wiring is typical but any twisted pair wiring suffices. This voice pair is used to carry +2-5 VDC digital signal between the phone and the Channel Bank Unit (CBU) 32. The CBU 32 is where the data combined at the phone CPU 21 is separated and interpreted. The CBU 32 uses a central processor CBU CPU 18 for interpretation of digital sound and other digital data including fingerprint and video data. This data will also pass through the wiring block (interface 7) which may or may not exist in the same location room [The use of a wiring block is not necessary, but is a standard connection between a phone bank (a plurality of phones) and a CBU CPU 18.]

The phone 1 is mounted where existing wires or new wiring require it. The phone is connected to a standard phone punch down block, interface 7, then a ship cable (amphenol cable 23) connects the interface 7 to the CBU 32 which may be rack mounted or otherwise in communication in a computerized equipment rack (having a CBU CPU 18) for communicating information to one or more sources which could include third parties such as enforcement authorities or monitors of all or selected parties of the data.

Typically, an existing facility will have Category III wiring or better (Cat. V), which alleviates the need to rewire the entire site. The digital system, in this embodiment, only requires two twisted pairs to be run to the digital phone housing.

In the preferred embodiment, there are micro-processors in the 32 and the phone 1. The phone has housing circuitry in the form of a circuit board.

The digital phone CPU (microprocessor) 21 is attached to at least one circuit board 19. The CPU 21 communicates by way of direct attachment to the phone circuit board 19 containing the processing chips which controls and communicates back to the CBU 32. The accessories (described below) are attached to ribbon cable 26 or mounted on the phone housing 24 by interface with the phone circuit board 19. In the embodiment shown the circuit board 19 is connected to a fingerprint reader device 11, a credit card reader 12, a digital information GUI (a number pad) 25, a first camera 13, a first microphone 15 and, in this example, a second camera 14 and second speaker 16. The circuit board 19 communicates with the CBU CPU 18 via the voice pair 4 of twisted wires. The handset 31 connects directly to the circuit board via wire "plug" 6 from a variable length lanyard 27 located on the face 29 of the phone housing 24. The length of lanyard is customizable or may be replaced with a radio signal in which case the plug would be replaced with a transceiver in the phone 1.

In FIG. 1, a monitor 47 is shown which is run from the CBU CPU by way of a connection to the third wire set 3 running from the CBU 32 to the wall where the monitor is hooked up.

The phone CPU 21 accepts and organizes the data from the aforementioned items and further breaks these down utilizing processes described below.

The phone communicates via the digital data line formed by the voice pair 4 (2-5 VDC wire pair) to the CBU 32 which then connects from the CBU 32 to the call manipulation servers, here CPU CBU 18 via USB cable 34 and a two (2) twisted pair/four (4) wire cable 35 with a RJ45 connection on each end. One end of the RJ45 cable connects to the CBU 32 and the other end connects to a PCI T1 card 61 installed in the (CBU CPU 18) which may be a computer based system of the type described in U.S. patent Ser. No. 09/516,381 Filed Feb. 29, 2000.

The CBU 32 communicates to the CBU CPU 18 via the aforementioned interfaces (USB for camera and print data and the RJ45 connection cable for all other data including voice with a storage means, hard drive 36, to retain the data transmitted from the print phone CPU 21 to the CBU CPU 18; ultimately ending up on the server computer, SCC 30, with any specified storage medium (here hard drive 36). An API program or chip with program is running on the controller computer (SCC 30) to handle communications from the CBU 32. The CBU 32 is transmitting and receiving data as needed through synchronous, bandwidth on demand, digital communications from each digital fingerprint phone housing 1 attached to the CBU 32 as described above. Specialized software modules are running on the Windows based computer system and communicate programmatically to the CBU API also running on the computer system as previously described.

The preferred storage medium on the CBU 32 includes, but is not limited to, a hard drive 38 with RAM 39 for accepting and/or storing information from the data received and processed by the specialized software modules and the CBU's software API.

Storage media may be located at the phone, the CBU 32 and the SCC 30 shown in FIG. 2.

This storage medium in which received data is stored, driven, and accessed is processed and controlled by the software modules received by special communications with the CBU's API running on the computer system (co-existing and running with software modules on the phone and CBU 32. Different storage types would be more useful at different locations. For example short term phone RAM 41 storage may be more useful at the phone where only short term storage is required. The CBU CPU 18 could have CBU ram 39 and the CBU CPU 18 a hard drive 38 depending on the level of control required at that level. The system controller computer SCC 30 would have both RAM 40 and hard drive 36.

This phone storage medium may also accept information provided by the CBU CPU 18 through system software accessing the CBU API 42 for purposes of running the digital phone, prioritizing information sent by the phone to the CBU 32 and controlling access to the phone as described.

The CBU 32 provides the communications and powered digital signaling required to operate the "print phone" 1 and its associated circuitry. This is achieved through the second pair of wires described as the voice pair 4 running from the Amphenol connector 23 located on the back of the CBU circuit board 43 and possibly passing through a MDF/IDF interface or equipment rooms housing punch and/or wiring blocks (interface 7) allowing the CBU 32 to operate up to 24 digital phones 1 per cable 23. Each phone operated requires the one (1) extra twisted pair per housing be present and connected for a total of 48 wires (24 pairs for 24 phones) not including the 20-56 VDC descried which may use a single line 5 to multiple phones.

The CBU 32 typically does not accommodate the main power wiring and this comes from an independent power supply co-located with the CBU or CBU CPU 18 or located elsewhere in the facility (it may be at the phones). This power from the source to the phone will also require two (2) twisted pair wires as previously described for a total of two (2) pairs, or four (4) total wires, per digital print phone housing, two methods are shown in FIGS. 3 and 4.

Figure 5:
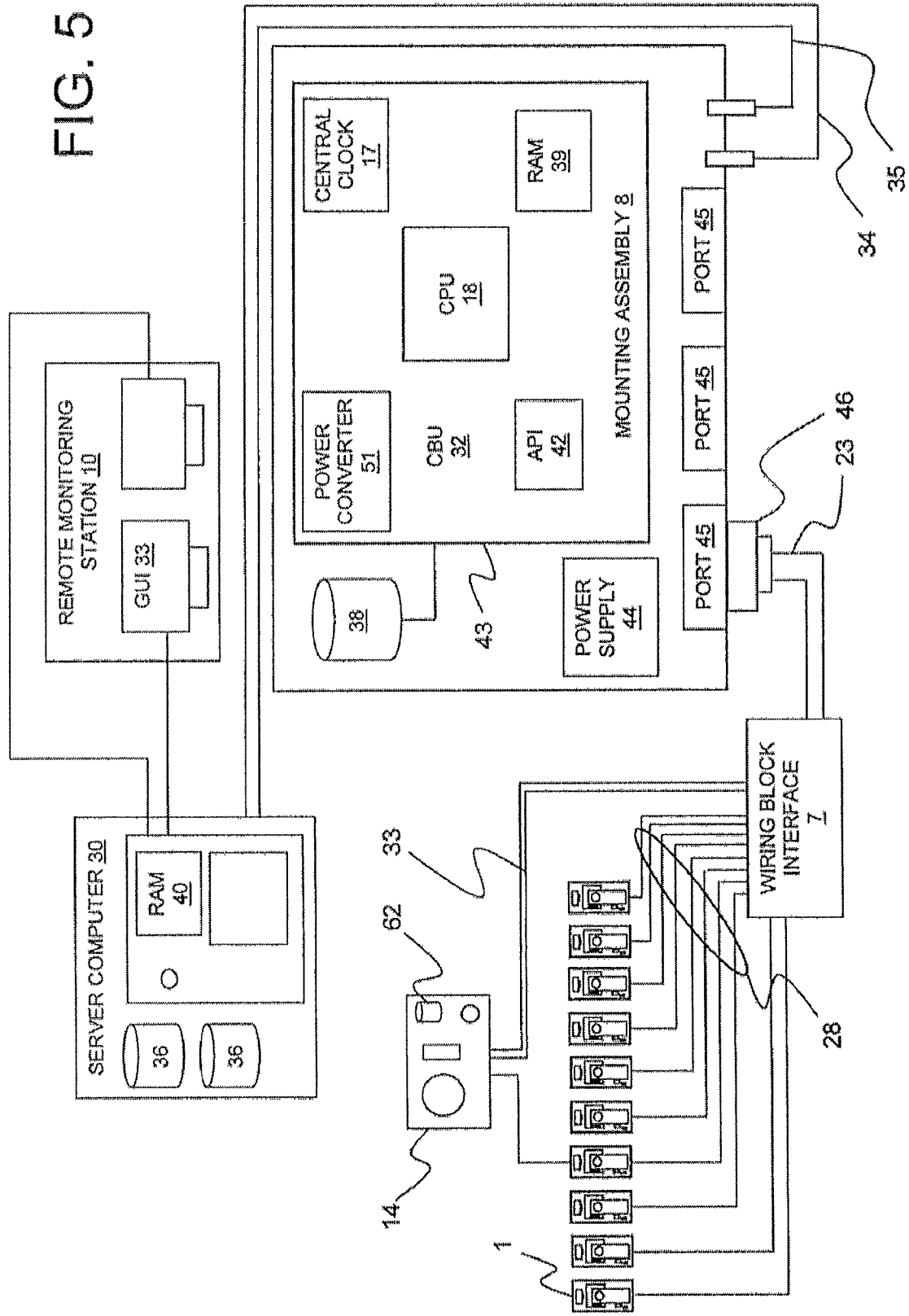
FIG. 5 shows how several phones can be arranged into a single interface.

One alternative would be to have the phones have a battery 70 which would charge using the one two wire set, voice pair 4, while the port was not in use. The phone would then switch to a communication mode when the phones went off hook, battery 70 could receive a separate charge as shown in FIG. 5.

The power required to operate the CBU 32 unit comes from a power supply 44, preferably but not required to be, co-located in the computer system rack or mounting assembly 8 securing the CBU 32. The CBU 32 output power range is +5 VDC over the digital communication lines 4 but the power supply required to run the CBU 32 can range from 5 VDC up to 56 VDC. This large voltage acceptance range is accomplished through a regulator circuit 9 on the CBU circuit board which allows the CBU 32 to utilize the same power supply 44 in FIG. 4 that could be used to power the 20-56 VDC supply for the phones. This proves to provide greater flexibility by minimizing the requirements for specialized power sources and allows for the use of standard 48 VDC analog phone power supplies to operate the CBU 32.

From the punch down or wiring block, interface 7, wires 28, including at least 1 wire pair 4 run to each phone for the communication signal in the preferred embodiment, although these may be separated using the exiting phone lines as described above. The CBU 32, for purpose of digital communication, provides enough power to power the entire connector 23 (whip cable) for phone powered by a single array of phones (24 lines) in the preferred embodiment (shown in FIG. 3). It is possible to run a higher number of digital phones by adding additional Channel Bank Units 32 or additional cable inter face assemblies 46 attached to ports 45 on the CBU circuit board, although each CBU 32 circuit board typically has some port 45 limit. One cable interface assembly 45 is shown in FIG. 2 being used, a second port 45 is shown without a cable attached.

The port limit is currently set to stay with in operational limits but expandability is possible to allow more phones per CBU unit.

Deviation from typical category three or five wire is permitted. Some installation survey results have noted only two (2) twisted pairs pulled to each phone mounting location. As shown in FIG. 3, with a third wire pair 3 allows a power independent carrier 47 could be run from the CBU 32 by pairs 3.

In order to maximize reliability of the phone system, decrease maintenance, and improve performance, the novel phone uses a digital sensor 48 for an on and off hook signal by installing a magnetically sensitive digital sensor 48 (a non digital sensor could also be used) which is normally open [or normally closed programmable at the users discretion] in the cradle 49 and powered by the phone circuit board 19. The magnetic speaker 50 which is built into the phone handset 32, is read by the sensor 48, to determine the hook state of the digital phone system. The sensor 48 is read and communicates with the digital phone housing via connection to the phone circuit board 19 and the phone CPU 21 interprets the results from the sensor and generates the appropriate on or off hook signal from the phone CPU. The signal is sent over the data line to the CBU CPU and ultimately fed to the CBU API 42 for final translation and provides a "message" to any software module programmed to look for this message. The software module can then utilize the message in any way to provide the on/off hook data and handle it accordingly powering the handset speaker end receiver. This digital hook switch provided by the sensor 48 allows there to be no moving parts which are present on the traditional phone housings and improves reliability and removes mechanics which are a portion of failures encountered in field environments. The phone may also be electronically taken "off hook" for monitoring the phones or attached devices by designation from a remote processor, such as from a GUI 33 in contact with the SCC 30 for monitoring purposes using this type of switch.

The 2 wire solution uses a custom designed communication networking protocol. A network type sharing of one or more CBU's connected to the system computer controller as described above is used. In the preferred embodiment, the invention uses pre-emphasized networking (RS-485 type) from a power prospective but not a protocol prospective) to achieve full-duplex protocol over the second pair 4, so that communications between the phone CPU 21 and the CBU CPU 18 are efficient. In the preferred embodiment, the mixture of voice and data over the same wire pair (second pair 4) allows for more information to be shared than with traditional wire phones. Protocol preferences allow two or more different data streams to share the line. The data and voice are digitized at the phone to accomplish this. Since voice and data share the same pipeline with an expandable bandwidth beginning at around 500 KB, the voice is (in the preferred embodiment) prioritized by the phone CPU and CBU CPU to avoid any latency in voice transmission. Voice has priority over the line and data is stored linearly or by data type and time and passed through on a first in/first out scenario or by type preference controlled by the digital phone CPU subject to overriding requests from the CBU CPU then interpreted by the CBU CPU based software API. There is 500 KB+bandwidth on each digital pair on each phone. In the preferred embodiment, the power pair carries nothing but power. The priority may be varied in this embodiment by software instructions.

The date is preferably prioritized in time sent and in amount/quality. The priority may be preprogrammed subject to overriding commands which overriding commands are subject to predetermined minimums which minimums of quality and timing are subject to overrides which minimize quality or timing and purpose.

The protocol eliminates traditional tip and ring DSL requires it. DSL requires a digital filter on the lines. DSL uses multi tone frequencies to transmit and receive data (audio). Typically, a DSP would be required if this were using a DSL type connection. The penalties of this type of protocol would be inefficiencies, larger power consumptions and increase in cost.

The customized protocol process eliminates the power consumptions and increase in cost. On demand bandwidth is used to further reduce power consumption. As the digital phone housing needs to transmit data (bandwidth), this demand is requested over a small communications (2 KB/s low with potential for adjustment if necessary) channel that is always maintained by the both the CBU CPU and the phone CPU. NRZI is the signaling bit which maintains the packet structure. Non-Return-to-Zero Inverted (NRZI) is a method for transmitting and recording data where bit stuffing is employed—the practice of adding bits to a data stream. These added bits can create a long string of similar bits, which register to the receiver as a single, unchanging voltage. Since clocks adjust on voltage changes, they lag behind true time. NRZI ensures that after a 0 bit appears, the voltage will immediately switch to a 1 bit voltage level. These voltage changes allow the sending and receiving clocks to synchronize. This handles the data transmissions and the clock rate to maintain synchronization and packet clock rate. The voice maintains the highest priority as previously mentioned. The data communication is full duplex. This allows for the transmission and reception at the same time. The bandwidths are not fixed bandwidths but are dynamically allocated by the digital phone CPU and the CBU CPU. In certain cases, the SCC may also participate in DSL. The up link and the down link is predetermined and remains constant; but in the present protocol, as per need of the device, it can be changed dynamically (real-time) by the CBU, SCC or phone CPU. In the described protocol, once the need of bandwidth has expired or concluded, it can be freed and allocated for the next service routine. Starting with the API, the data pump sends bytes as required by priority as established by the CPU's (voice vs. other data types and one type of data vs. another).

Further explained, the user may want one piece of data over the other or even to halt voice to receive other data if required or requested. A pre-programmed message informing of a pause or call termination may be programmed in at the phone to notify the phone user and at the SCC or CBU for the call recipient to inform them of the call be suspended or terminated. This flexibility allows IIS to make the GTL digital phone fingerprint design possible. Biometrics data is also multiplexed with voice and data over the same line. The voice data at the digital phone is converted from analog to digital by use of a codec then digitally transmitted to the CBU. Then the CBU CPU sends the data to the requesting API on demand via API calls as required. The data transmissions are controlled by the Programmable Logic Levels (PLL).

As can best be seen by reference to FIGS. 1 and 2 in the preferred embodiment, the invention utilizes a standard telephone interfacing (with a standard jack no shown) which carries up to four pairs of line, 3 pair, 3, 4, and 5 shown here. Two wires (4) are used for the digital communication function of the telephone and two wires (5) are being available for carrying a higher voltage to power the telephone 1. The phone uses only two twisted pair, one digital to the phone, one voltage supply to the phone. No high voltage ring lines, are used. By virtue of the digital technology, additional circuits on the board or additional unconnected resources (like camera or biological marker with it's own communications protocol 47) may be connected to take advantage of the extra lines 3 if available and needed.

The remote monitoring station 10 (which may have multiple stations to which the call is forwarded by directions sent via SCC, CBU CPU or outside phone line to the CBU) may monitor the telephone call for several different purposes. It may be a third party to whom the other parties look for quality control, it could be a monitoring company which maintains security over the lines, it may be for purposes of police surveillance, or it may be used for other services.

For example, in one embodiment the technology utilized herein would allow an employer to monitor, at a remote location, internet access and in another embodiment, it would allow a policy officer to monitor activity associated with a telephone call or events at or near the phone as well as identification procedures associated with the origin of the telephone call particularly at a prison phone.

The data generating device, e.g. finger print reader 11, under this scenario may operate in the manner known in the prior art or the data associated with the telephone may go through a CUP 21 as described in more detail in reference to FIG. 2 below.

In the most simple embodiment, shown in FIG. 1, there is at least one data generation device (e.g. item 11 which may be referred to as a means for generating digital or analog data).

Multiple generation devices are not absolutely necessary to every embodiment of the invention. FIG. 1 shows where there is a finger print reader 11, a card reader 12, a first video camera 13, a first speaker/microphone 15, a second video monitor 14, and a second speaker 16 associated with the second video monitor/camera.

In addition, the telephone is also generating device identification data at all times to the CBU for heartbeat (function) and station location information when associated with a GUI interface 25.

In one embodiment, shown in FIG. 1, there is, on site, and connected with each of the data generators an off site central processing unit 40. The unit 40 receives information from either the central office or the telephone unit 1 and may provide routing information.

In this example, each of the data inputs is assigned a number, data 1 through data 6, and each of these data are received by the central processing unit 18 and kept according to a central clock 17 so all the data can be associated with a particular time. Video images as well as the other data can be associated with the call. In addition, the DNIS and ANI data may be associated with time and the call data for purposes of associating data with a particular call or may be used as a part of the tracking information when the data is assigned routing information by the central processing unit 18 which is discussed in more detail below.

Each data type is associated with a format which allows the data to be most efficiently streamed over data wires. Call information may go through in an analog format with the data passing digitally through the same line using different bandwidths or tones. The data originating at the phone is sent to the combining unit here API 37 and CPU 21 which combines the data as well as the analog signal utilizing the clock information in order to present a complete package later.

The data originating at the CBU, CBU CPU or SCC is combined at the CBU by the CBY APT 45 and CBU CPU 18. In some cases this may be done at the SCC. The SCC functions may also be incorporated into the CBU CPU 18 eliminating the need for a separate SCC.

The central processing units 21 and 18 preferably have either a set of default instructions or receive overriding remote instructions from the remote operator determining what data is sent and when and even how (format and quantity and quality) the data is sent.

The local central processing unit 18 may be connected to any type of storage (item 32) to store data for any period of time in order to allow the remote user to acquire data which was not previously sent. Preferably this storage at item 22 would be sent to item 38 as soon as possible to prevent loss at the local phone because of damage, overload, etc.

This data may be stored at item 22 or 38 for a period of time in order to lower storage requirements at the SCC so the remote user can make a determination within the set period of time as to whether additional data may be required or not. The data may be stored in item 22 associated with time and then sent during low usage times so more data can be transferred without requiring additional data lines or delays.

In one example, video one data is turned into still pictures or short bursts of video or degraded video while maintaining a copy of the full video. The short burst of video sent over the data lines, is in a compressed format and viewed by the remote user after separation and decoding to a DSL or other format. The remote user at GUI 23 or the SCC, if so determined, can instruct the local processing units 18 or 21 to maintain a copy of the data in a larger or smaller (less complete) format which is determined automatically, by usage or usage times or which can be set according to the requirements of the remote user.

There can also be several different routings so that most of the data associated with the telephone call would go through the data lines but in certain circumstances the data can be rerouted to a limited number of high density (DSL or T1) lines determined automatically by a set of rules or as manually determined by the remote user.

The rules could use the DSIS or ANI information to make the determination, or various parameters associated with the data input itself such as the user data (such as reader 12 data) read at the phone.

One of the data inputs allows for fingerprint data stored locally, compared to confirmation and (from reader 12) to be continuously transmitted with prevents one user from utilizing fingerprint data of another user for an indefinite period of time. The same would be true for credit card data which can be associated with video data so the credit card is being utilized by the appropriate person.

For purposes of this discussion, the credit card reader 2 refers to any card reader for cards containing information required to transfer the data including PIN number data without actual charging data.

By allowing for the separate classification data by type with a call at a particular time and by method of transmission and by best compression, and by having a telephone signal or data signal enhancer, the present invention allows the data lines which may be very low density lines are utilized in order to transmit a large amount of information relative to their data carrying capacity and allow them to provide the data in a greatly enhanced fashion when the data is reinterpreted at the remote processing unit. Time once associated with another unit (e.g. a number assigned by software with the call) may be replaced for data transmission with the other unit (the number in this example).

A phone requires 24-48 v powered separately on 1 pair of phone wire (item 5) which only powers up the phone. On the old phone the 24-48 may carry everything. On the new system, this line merely powers the phone.

There are four ways that the phone is powered in alternate embodiments:

1) The old line (first pair of wires) is used to carry 24-48 volts (traditionally) to the phone from an exiting phone power source.
2) The old line (first pair of wires) is used to carry 24-48 volts to the phone from a new power system at the block or CBU.
3) A new power source is run to the phone from any convenient source near or directly connected to the phone.
4) The phone has battery power charged in off time by one set of liens otherwise dedicated to data.

A second pair of wires which carry the ringer-old technology- and that operates at 96 volts, is optional. In one embodiment this could carry 5 volts (more or less) of power for the microprocessor and accessories described below.

The third pair of wires to the phone could be rewired to carry 5 volts more or less to power and/or communicate the microprocessor and accessories described below to the extent not powered separately by the second set of wires.

In the preferred embodiment there is a CBU micro-processor in a central bank unit. This CBU micro-processor communicates by way of the second pair to the phone microprocessor which is located in the phone.

The phone CPU is attached to at least one circuit board which board communicates by way of electronic attachment with (1) a camera 13, (2) a speaker/microphone 15, (3) a finger print reader 11 and (4) a handset 3. Other devices may also be attached as allowed by compatibility.

In this example, the phone CPU accepts and organizes the data from items 1-4 according to the process described below. If necessary, the circuit board may also communicate with a storage medium, in the preferred embodiment a hard drive or ram 22 for accepting information from one of the items listed. This storage medium may be driven by the phone CPU 21 or a second phone CPU (not shown). This storage medium may also accept information provided by the CBU CPU 18 for purposes of running the phone, prioritizing information sent by the phone to the CBU and controlling access to the phone as described below.

The CBU provides communication and power digital communication through the second pair running from the circuit board in the CBU through a MDF or IDF line communicating directly with a punch down block 7 via a whip cable 23 in this embodiment allowing the power source to power up to 24 phones per cable.

The power to the CBU preferably comes from a power converter 51 in series with the signal from the CBU CPU. This power converter 51 plugs into a power source with a plug (not shown) into a wall outlet (not shown).

From the punch down block, a wire pair runs to each phone for the combined power and communication signal in the preferred embodiment, although these may be separated using the existing phone lines as described above.

One power line provides from the CBU then split to each of the separate phones for enough power to power the entire whip cable array of phones (24 lines) in the preferred embodiment. It is felt that multiple whip cable arrays could be similarly powered.

The new phone uses the second wire pair for digital communications and this is possible without rewiring because there are six to eight wires in the traditional wiring.

The second wire set provides a five volt digital signal used for communications (DTMF and voice) and for powering the phone circuit board. In order to minimize power usage and improve performance, the phone uses a magnetic sensor 48 for an off hook signal which switch is also connected to and powered by the phone circuit board 19. The magnetic sensors built into the phone cradle use the magnetic speaker 50 within the handset 3 to determine if the hand set is present or not. If not present, the sensor communicates with the phone CPU which generates the appropriate 'off hook' signal.

The 2 wire solution uses IIS proprietary networking protocol. A network type sharing of one or more CBU CPUs (in the preferred embodiment) uses pre-emphasized networking (RS-485 type) to achieve full-duplex protocol over the second pair, preferably a twisted pair, so that communications between the CBU CPU and phone CPU is expedited.

In the preferred embodiment, the mixture of voice and data over the same wire pair (second pair) allows for more information to be shared. The data and voice are digitized at the phone to accomplish this. Since voice and data share the same pipeline, the voice is prioritized by the phone CPU and CBU CPU to avoid any latencies in voice transmission. In an alternate embodiment, the voice of at least one phone is kept in analog.

The steps of this process are:
1) Determining the types of data desired to create a data group from the group consisting of voice, picture, bio-marker (finger print, retinal scan, etc.), card holder information (credit card number, etc.), DNIS and ANI call data, etc.;
2) Writing a protocol to prioritize the data types;
3) Adding a reader to receive the data;
4) Reading the data from the reader involving:
   (A) creating at least one circuit board;
   (B) connecting the readers to the circuit board;
5) Compiling the information from the readers including the steps of:
   (A) selecting the most efficient form for transmission of the data of each data type;
   (B) converting the data to a digitized forms corresponding to the efficiency determined by having wave type data converted into digital signals which are given a services of values (0 or 1) as a bit;
   (C) storing data which is not ready to send;
      (I) determining the amount of data to store
      (II) prioritizing data to be stored
   (D) determining the size of bytes containing the individual bits of data for each data type;
   (E) packaging the bytes to be sent
   (F) attaching at least one time reading to each data byte made up of digital data bits.
   (G) attaching a time reading for at least one predetermined period which time reading may be separated out (as a separate byte) to allow a remote clock to keep in time with the local phone clock;
6. Streaming data into bytes in association with the time marker into a transmission stream along with an identifier identifying the type of data being sent by;
   (I) the format,
   (II) attaching an initiating multi-bit or single bit identifier,
   (III) ordering the data;
7. Retrieving the data out of the data stream;
8. Separating the data by type based on the identifier
9. Maintaining the data with the time marker for at least one data type;
10. Using the time marker to maintain the time order of at least one form of the data for later transmission and alignment of different data types;
11. Determining the best method for transmitting data; and
12. Sending the data by at least one, and preferably a plurality, of transmission data streams separated electronically.

The method claim can be altered so that the step of streaming data includes the step of multiplexing the data by determining the amount of one data stream required while still allowing an other data stream;

Using several frequencies on the same channel to transmit several different streams of data from different readers, simultaneously is also within the modifications possible with this system;

Providing multiple streams of data which streams of data include different sampling locations for different types of data assigned to a particular location on the data stream to ensure that enough data is transferred from each separate source; and Combining two or more signals into a single signal to transmit over a communications channel.

Using N1Z1 clock protocol with 1 to 0 balancing type speeds may be one protocol used in conjunction with the telephone timing signals set forth above to keep the phone and CBU and main monitoring CPU in communication.

On demand bandwidths generated by the phone circuit board or CBU or main monitoring CPU depend on the requirements and origin of the data or as set by the user.

Using asymmetric control of down and up datapaths allows the bandwidths to be un-fixed bandwidths. These bandwidths are dynamically allocated for total bandwidth as apposed to a DSL fixed up and down stream bandwidth.

This flexibility allows the system to make GTL fingerprint design possible. Biometrics data may also multiplexed with voice and data over the same line.

FIG. 3 shows a modification where there are analog phones 56 and digital phones 1. Power is shown through separate lines going separately in this case to analog and digital phones.

FIG. 3 shows a wiring diagram where analog phones 1b and digital phones 1a act within a single system.

In this situation a first power supply 44a is connected by power pair 5 through interface 7b (a wiring block or 66 block) which has a outgoing power pair 5a to at least one digital phone 1a. Alternate phone bank 64, which is not shown in detail, may be analog or digital and run off the lines to the analog or digital phone (as shown here as running off block interface 7a).

The data signal comes through a data wire pair 4 through a wiring block (66 block) if the multiple phones are directly from the wiring block 7c in the equipment room 65 which in turn connects the data pair 4a to a CBU 32 which communicates with a separately assembled CPU (in this case a controller computer) 18 by way of a USB port 34. Between the channel block 7c and the CPU is a 24 line anthenol connector 23.

The CPU 18 communicates via a port 61, a T1 port and a central office 60. It also receives power from a second power supply 44. The controller computer (CBU CPU 18) in this example is connected directly in this case via a second anthenol cable 54 to a punch down block 72 which is connected directly to analog phone 1b, which in this case, will not function as a digital phone but as normal phones connected directly to the computer and providing an analog connection. For these lines, the computer provides an analog connection or a digital conversion through the T1 card to the central office.

FIG. 4 shows a similar arrangement to that in FIG. 3 wherein the system is improved to allow for two twisted pairs per phone, one being a data pair 4, and the other one being power pair 5 coming respectively from a data box 7a and a power box 7b. Power box 7b receives power from a 48 volt VC power supply and 44a in the IDF equipment room 66. The data going to the data block 7a is, in turn, attached in the NDF equipment room 65 via a second wiring block 7c to the 24 port CVU 32 with is connected to the CPU 18 which is a separate computer in this embodiment via a RJ45 cable 69 and a USB cable 34.

A second USB cable 63 connects the computer 18 to a local monitoring station 68. It also connects through the central office 60 to a remote monitoring station 67. Either the monitoring station sends protocall changes and receives data from the CPU 18 which in turn can go to the individual telephone CPU as described above.

In this case, remote monitoring station houses the remote hard drive 36. FIG. 5 shows how several phones can be arranged into a single interface 7. Differences in this embodiment are that local to the phones 1 is a local battery 70, a common phone storage 62 and one of the lines is a common storage line 53 (which may be multiple lines) which use excel lines to carry non-voice data directly to the CPU 18 so the phone lines may remain constantly interfacing from a voice standpoint with the CPU 18 through a common storage line 53 dedicated for that purpose which would otherwise be available for an individual phone block. Since the data may be associated with a marker identifying not only the time but also the source phone, this data may be aligned with data from the telephone at some later point in time.

For alignment purposes, the time is the preferred marker, but a phone location or a random number assignment or a number of assignments associated with the time and a particular phone may be utilized. Where the time is used, it may be the beginning and or end of the call as well as the phone line.

This same interpretive view is shown for exclusively digital lines in FIG. 4.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A device for generating telephone data, comprising:
    a first phone device comprising a handset for accepting and generating electromagnetic voice signals;
    a circuit board electronically connected to the handset;
    at least one input means for receiving digital data and delivering the digital data directly to the circuit board from the input means electronically connected to the circuit board;
    a processor for generating an associating marker to the voice signals and digital data, prioritizing the data in terms of importance, and communicating the data according to the importance;
    a phone line having a first end electronically connected to the circuit board for receiving the signals and digital data from the phone line and carrying remote digital signals to the processor, said phone line having a second end; and
    a cpu connected to the phone line second end for accepting the signals and digital data from the phone line and processing the signals into a completed telephone call and processing the digital data into digital information available for examination;
    wherein the input means includes at least one of:
        a video input device,
        a user identifier comprised of a biometric thumbprint reader,
        a digital station information identifier,
        a microphone means for listening,
        a video means for recording video images,
        a card reader means for obtaining data from a card, and
        a biological marker reader.

2. The device of claim 1 wherein the processor further comprises a means for determining the type of data desired for the digital data and a formatting means for formatting the data into a signal according to the determination of the processor.

3. The device of claim 1 wherein the processor and cpu further comprise a call regulating means for notifying of the termination or suspension of data due to priority.

* * * * *